United States Patent [19]

Kondo et al.

[11] 4,386,373
[45] May 31, 1983

[54] FACSIMILE APPARATUS

[75] Inventors: Mitsuru Kondo; Akira Konishi, both of Tokyo, Japan

[73] Assignee: Ricoh Company, Ltd., Tokyo, Japan

[21] Appl. No.: 282,973

[22] Filed: Jul. 13, 1981

[30] Foreign Application Priority Data

Jul. 18, 1980 [JP] Japan ................................. 55-97566
Oct. 27, 1980 [JP] Japan ............................... 55-149380
Oct. 27, 1980 [JP] Japan ............................... 55-149381

[51] Int. Cl.³ .......................................... H04M 1/38
[52] U.S. Cl. .................................. 358/260; 358/261; 358/257; 364/514
[58] Field of Search ............... 358/261, 257, 260, 133, 358/138, 267, 286, 288; 364/515

[56] References Cited

U.S. PATENT DOCUMENTS 4,044,382  8/1977  Yagishita ............................. 358/260
4,131,915 12/1978  Nakagome et al. ................. 358/261
4,149,192  4/1979  Takeuchi ............................. 358/260
4,276,544  6/1981  Iinuma ................................ 358/261

Primary Examiner—Robert L. Griffin
Assistant Examiner—Edward L. Coles
Attorney, Agent, or Firm—David G. Alexander

[57] ABSTRACT

A predetermined number of plural lines of compressed data are processed as one group before addition of fill bits while a minimum transmission time for each such predetermined number of lines, that is, plural lines having a predetermined length is determined in advance in consideration of a recording speed and other operating factors of a receiver. Necessary fill bits are added to each plural lines only when the actual transmission time of the plural lines of compressed data is shorter than the minimum transmission time. Fill bits may be added to compressed data bits not only for each plural lines but on a line by line basis in combination in accordance with a construction and function of a receiver.

6 Claims, 19 Drawing Figures

Fig. 3a
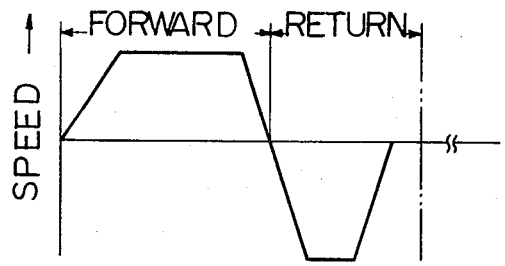
Fig. 3b
Fig. 3c
Fig. 3d
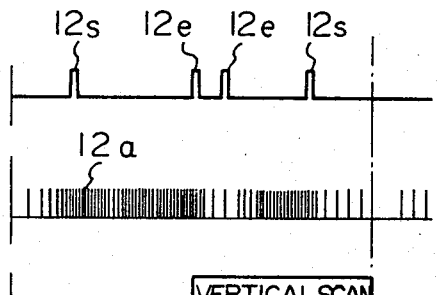
Fig. 4
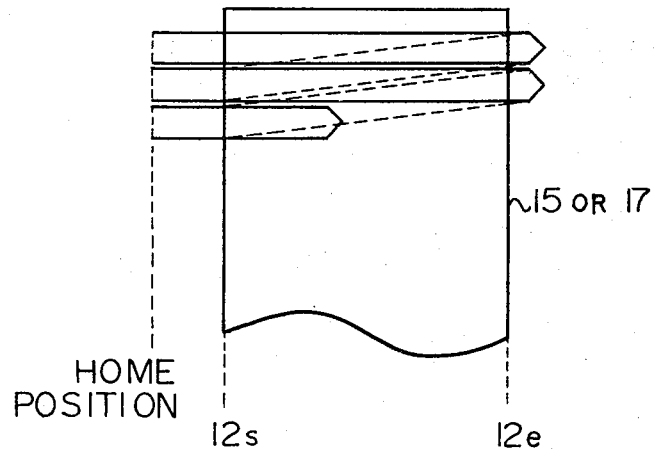

FACSIMILE APPARATUS

BACKGROUND OF THE INVENTION

The present invention relates to a facsimile apparatus which can have communication with a remote receiver regardless of the type of the latter and, more particularly, to a system for adding fill bits to compressed data bits in the event the compressed data are to be transmitted from the transmitter to the receiver.

Facsimile transmission systems are extremely useful for transmitting original documents in numerous commercial and bureaucratic applications. The original document is scanned to produce electrical signals which are transmitted over a telephone line or the like to a remote receiver. The receiver prints a facsimile or reproduction of the original document in response to the received signals. In order to increase the transmission speed, it is desirable to compress the signals for transmission using run length encoding or the like.

The original document is scanned to an orthogonal pattern of scan lines and the signals are transmitted on a line by line basis. Each line of compressed data consists of data bits and fill bits. A sync code is added at the end of each line. In order to minimize the buffer memory requirements of the receiver, each line of data has a predetermined length and the printer at the receiver is constructed to print each line faster than it is compressed and transmitted. Thus, each line of compressed data has a predetermined number of bits. Often, the run length code is quite short, and fill bits, generally consisting of zeroes, are added to the data bits to increase the length of the line to the predetermined value. Printing of a new line is effected in response to detection of a sync code.

A problem has existed heretofore in this type of facsimile transmission system regarding insertion of fill bits. Where an actual transmission time for one line of compressed data, that is, an actual length of one line of compressed data is shorter than the predetermined value mentioned above, it has been customary to add fill bits to the data bits line by line so that the one line transmission time or one line bit length increases beyond the predetermined value. With such a known system, video data in a whole page connot be transmitted without accompanying a substantial number of fill bits in total. This only serves to limit the effect of data compression which is laboriously employed to shorten the transmission time. Though the total number of necessary fill bits may be reduced if the data reading or data recording operation is sped up, it is difficult at the present stage of development to increase the reading speed or the recording speed, particularly the latter. Speeding up the reading and recording operations will make the apparatus too expensive as a whole to find a wide range of applications.

SUMMARY OF THE INVENTION

The present invention has been elaborated in view of the fact that the length of number of bits of compressed data little differs from one group of successive plural lines to another of the same number of lines though it may differ a great deal from one line to another.

In one aspect of the present invention, a predetermined number of plural lines of compressed data are processed as one group before addition of fill bits while a minimum transmission time for each such predetermined number of lines, that is, plural lines having a predetermined length is determined in advance in consideration of a recording speed and other operating factors of a receiver. Necessary fill bits are added to each plural lines only when the actual transmission time of the plural lines of compressed data is shorter than the minimum transmission time.

In another aspect of the present invention, fill bits are added to compressed data bits not only for each plural lines but on a line by line basis in accordance with a construction and function of a receiver. This permits the facsimile apparatus to get into communication with another of a different type, whatever the type of the latter maybe.

It is an object of the present invention to provide a facsimile apparatus which permits even a different type of facsimile apparatus to accept video data and, by effecting insertion of fill bits to compressed data bits in conformity with a construction and arrangement of the receiver, cuts down the total number of necessary fill bits to thereby transmit video data with an excellent efficiency.

It is another object of the present invention to provide a generally improved facsimile transmission system.

Other objects, together with the foregoing, are attained in the embodiment described in the following description and illustrated in the accompanying drawings.

BRIEF DESCRIPTION OF THE DRAWINGS

FIGS. 3a-3d are timing charts explanatory of operations of the arrangement shown in FIGS. 2a and 2b;

FIG. 4 is a diagram showing a manner of scanning a sheet with the arrangement of FIGS. 2a and 2b;

DESCRIPTION OF THE PREFERRED EMBODIMENTS

While the facsimile apparatus of the present invention is susceptible of numerous physical embodiments, dependent upon the environment and requirements of use, substantial numbers of the herein shown and described embodiments have been made, tested and used, and all have performed in an eminently satisfactory manner.

Figure 1:
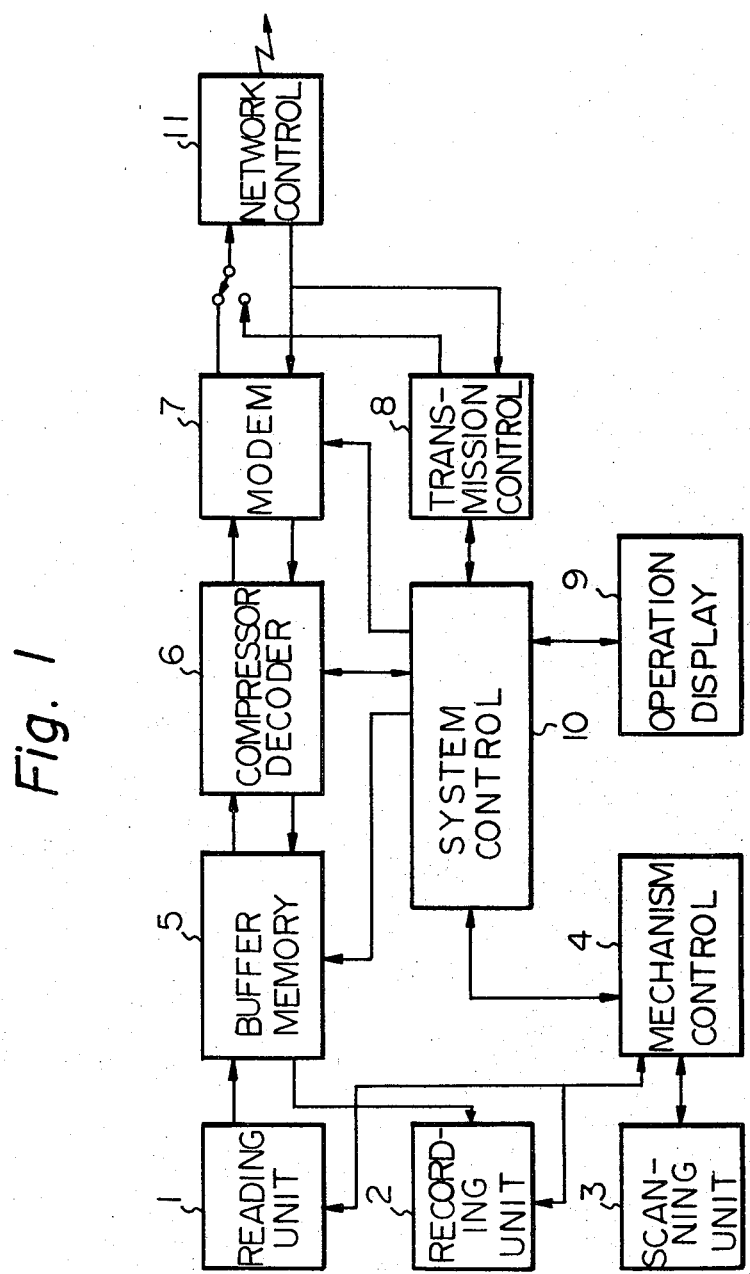
FIG. 1 is a block diagram of a facsimile apparatus embodying the present invention.

Referring to FIG. 1, there is shown a first embodiment of the facsimile apparatus according to the present invention. The apparatus includes a reading unit 1, a recording unit 2, a scanning unit 3 adapted to actuate the reading unit 1 or the recording unit 2 into horizontal and vertical scaning operations, and a control unit 4 for controlling the operations of such mechanisms 1–3. The apparatus also includes a buffer memory 5 having a capacity of 32 lines×2, a unit 6 for compressing or decoding data on a line by line basis and a modem 7. Additionally included in the apparatus are a transmission control unit 8 practicing a facsimile control procedure, an operation display unit 9 for communication between the apparatus and the operator, a system control unit 10 controlling the various units mentioned, and a network control unit 11 serving to connect the apparatus with a telephone line or the like and other predetermined functions.

Figure 2A:
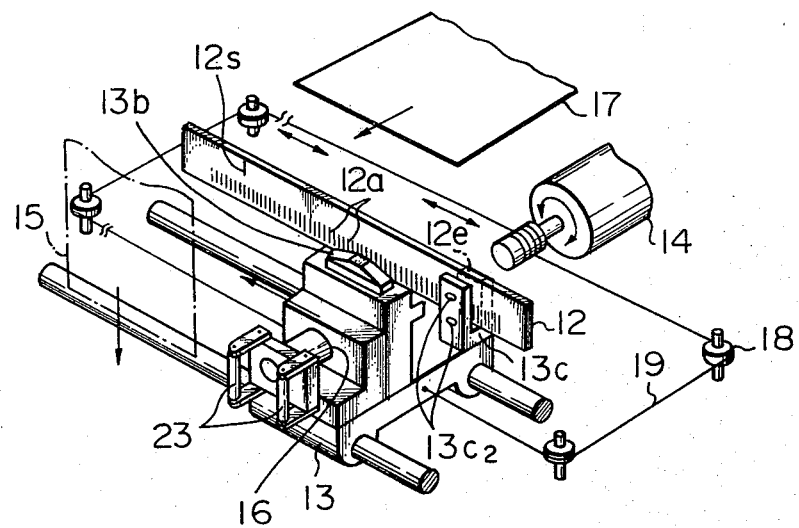
FIGS. 2a and 2b are a perspective view and a sectional side elevation of a practical arrangement of a combined reading, recording and scanning section of the facsimile apparatus, respectively.
Figure 2B:
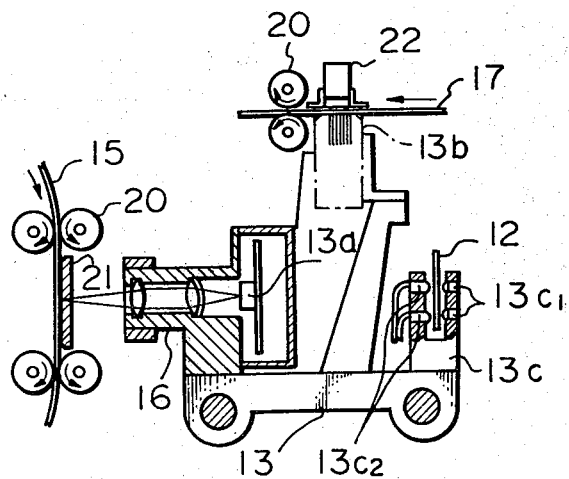

A practical arrangement including the units 1–3 is depicted in FIGS. 2a and 2b. A scale plate 12 is fixed in place on the framework of the apparatus while a carriage 13 is driven by a DC motor 14 to reciprocate along the scale plate 12 in the horizontal scan direction. The scale plate 12 is formed with a series of slits 12a each of which defines a specific horizontal scan position for reading data or recording data. Also formed in the plate 12 are slits 12s and 12e adapted to define an effective reading or recording width.

The carriage 13 has thereon a reading head 13a, a recording head 13b and a slit detector assembly 13c which will detect the slits on the plate 12 in succession during movement of the carriage 13. The reading head 13a includes a plurality of bits of reading elements which are so arranged as to read out 32 lines of video data in an orthogonal pattern of scan lines. Images on original document 15 corresponding to the horizontal scan position will thus be progressively focused onto the reading elements through an optical system 16. The recording head 13b on the other hand carries styluses which are adapted to print 32 lines of video data on a paper sheet 17 in an orthogonal pattern identical with that read by the reading head 13a. The slit detector 13c comprises a light emitting element $13c_1$ and a light receiving element $13c_2$ which face each other with the scale plate 12 positioned therebetween. During movement of the carriage 13, the slit detector 13c will produce predetermined signals which correspond to the individual slits on the scale plate 12.

The reference numeral 18 denotes pulleys around which a wire 19 runs driven by the DC motor 14 for thereby driving the carriage 13 for reciprocation. The original document 15 is conveyed by rollers 20 on and along a glass platen 21. A counter electrode 22 is positioned to cooperate with the styluses on the recording head 13b. Lamps 23 are associated with the optical system 16 to illuminate the original document 15 in the course of data transmission.

When the mechanism control unit 4 is actuated to energize the DC motor 14, the carriage 13 is caused to move along the scale plate 12 starting from its predetermined home position. In response to successive outputs of the slit detector 13c, the carriage 13 is accelerated progressively as indicated in FIG. 3a until a predetermined speed is reached. After this, the slit detector 13c soon detects the slit 12s as viewed in FIG. 3b. Then, as seen in FIG. 3c, the reading head 13a or the recording head 13b is driven in response to the slits 12a which will be detected thereafter, thereby reading or recording each 32 bits of video data in the vertical scan direction. As the carriage 13 moves until the slit detector 13c detects the slit 12e, meaning the end of processing 32 lines, the carriage 13 is decelerated as seen in FIG. 3a and strokes back toward the home position at a high speed. In the meantime, the document 15 or the paper sheet 17 is fed vertically as seen in FIG. 3d. Such a procedure is repeated thereafter to read out or record each 32 lines of data from the document 15 or on the paper sheet 17 in the manner illustrated in FIG. 4.

During transmission, each 32 bits of video data produced from the reading unit 1 is successively stored in one 32-line memory block in the buffer memory 5 while, at the same time, previous 32 of video data are produced line by line from the other 32-line memory block to be coupled to the compressing unit 6. During reception, decoded video data produced from the recording unit 6 is successively stored line by line in one 32-line memory block in the buffer memory 5 while, at the same time, each vertical 32 bits of data is supplied from the other 32-line memory block to the recording unit 2.

Figure 5:
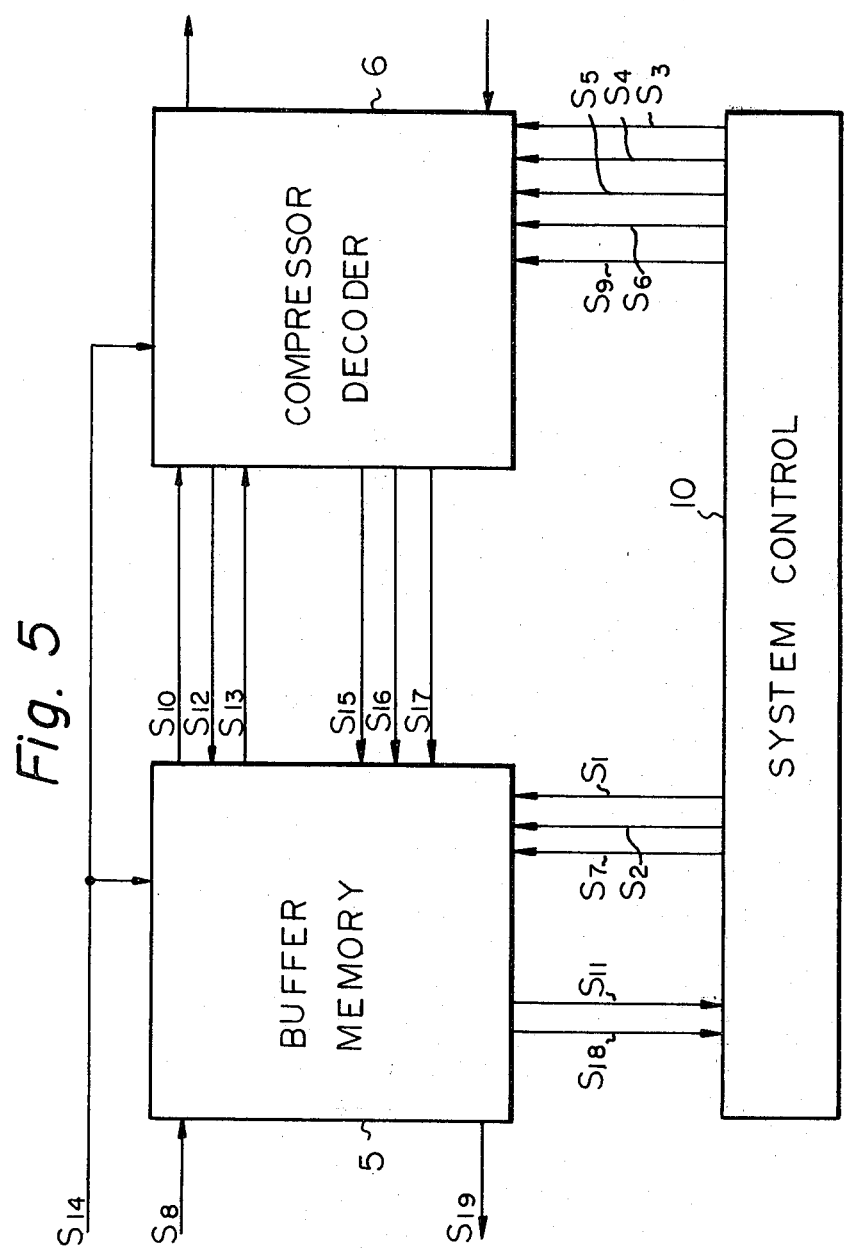
FIG. 5 is a diagram showing various signals which are exchanged between a buffer memory, a compressing/decoding unit and a system control indicated in FIG. 1.

FIG. 5 shows various signals which represent interactions among the buffer memory 5, compressor/decoder 6 and system control 10 during data reading and data recording operations of the apparatus.

Now, the illustrated arrangement is so constructed to alot, for example, at least a 5 ms of minimum transmission time to one line of compressed data and at least a 640 ms of minimum transmission time to 32 lines of compressed data. This will permit the apparatus to attain communication even with a remote receiver of the type which is furnished with a buffer memory having a capacity of 1 line×2 and designed to read or record data on a line by line basis. Obviously, as such will be needless if the receiver is equipped with a buffer memory whose capacity is as large as that of the transmitter, i.e. 32 lines×2.

The apparatus having the construction mentioned above will be operated as follows.

During transmission, the system control 10 supplies a clear signal S1 to the buffer memory 5 so that shift registers inside the buffer memory 5 restore an initial condition. At the same time, a transmission mode set signal S2 is coupled from the system control 10 to the buffer memory 5 conditioning the latter for data transmission. The system control 10 also supplies the compressor 6 with a clear signal S3 to initialize a status register in the compressor 6, a transmission mode set signal S4 to command a compressing operation, and a fill bit control signal S5 or S6 to instruct a minimum 1-line transmission time which may be 5 ms instructed by the signal S5.

After the buffer memory 5 and compressor 6 have been fully initialized, the system control 10 delivers a command to the mechanism control unit 4 (see FIG. 1)

so that the reading unit 1 is caused to start reading data by each 32 lines. Simultaneously, the system control 10 activates the buffer memory 5 by delivering a buffer start signal S7 thereto. When either one of the 32-line memory blocks in the buffer memory 5 becomes filled with video data S8 which is produced from the reading unit 1 in action, the system control 10 supplies a start signal S9 to the compressor 6.

Figure 6:
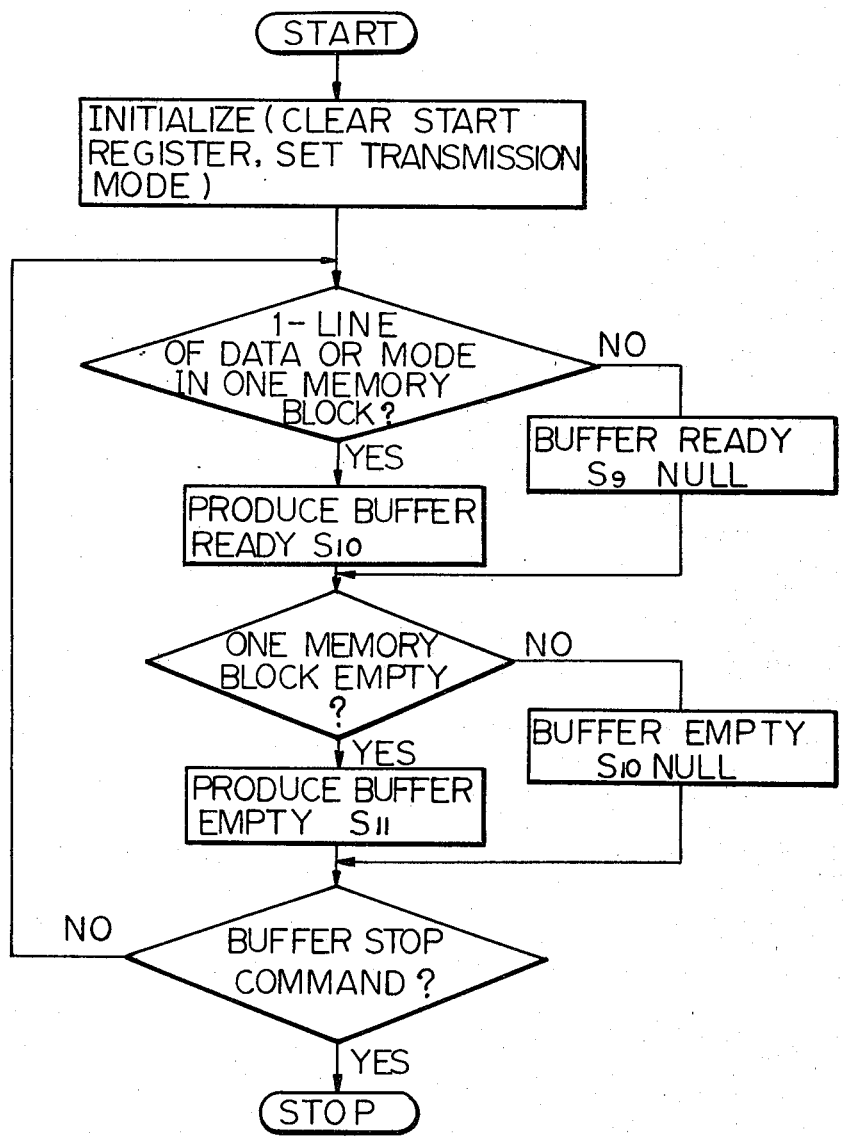
FIG. 6 is a flowchart demonstrating an operation of the buffer memory.

Upon a start of operation, the buffer memory 5 as shown in the flowchart of FIG. 6 determines whether or not either one of its memory blocks has been loaded with at least one line of video data to be coupled to the compressor 6. If one memory block has been loaded, the buffer memory 5 supplies the compressor 6 with a buffer ready signal S10. If at the same time the other memory block is empty and ready to receive another group of video data S8 from the reading unit 1, the buffer memory 5 delivers a buffer empty signal S11 to the system control 10. While a buffer empty signal S11 is being produced from the buffer memory 5, the system control 10 couples a read command to the mechanism control 4 at an interval of 640 ms. Based on this command, 32 lines of video data S8 read out by the unit 1 is stored in a memory blocks which is empty then.

Figure 7:
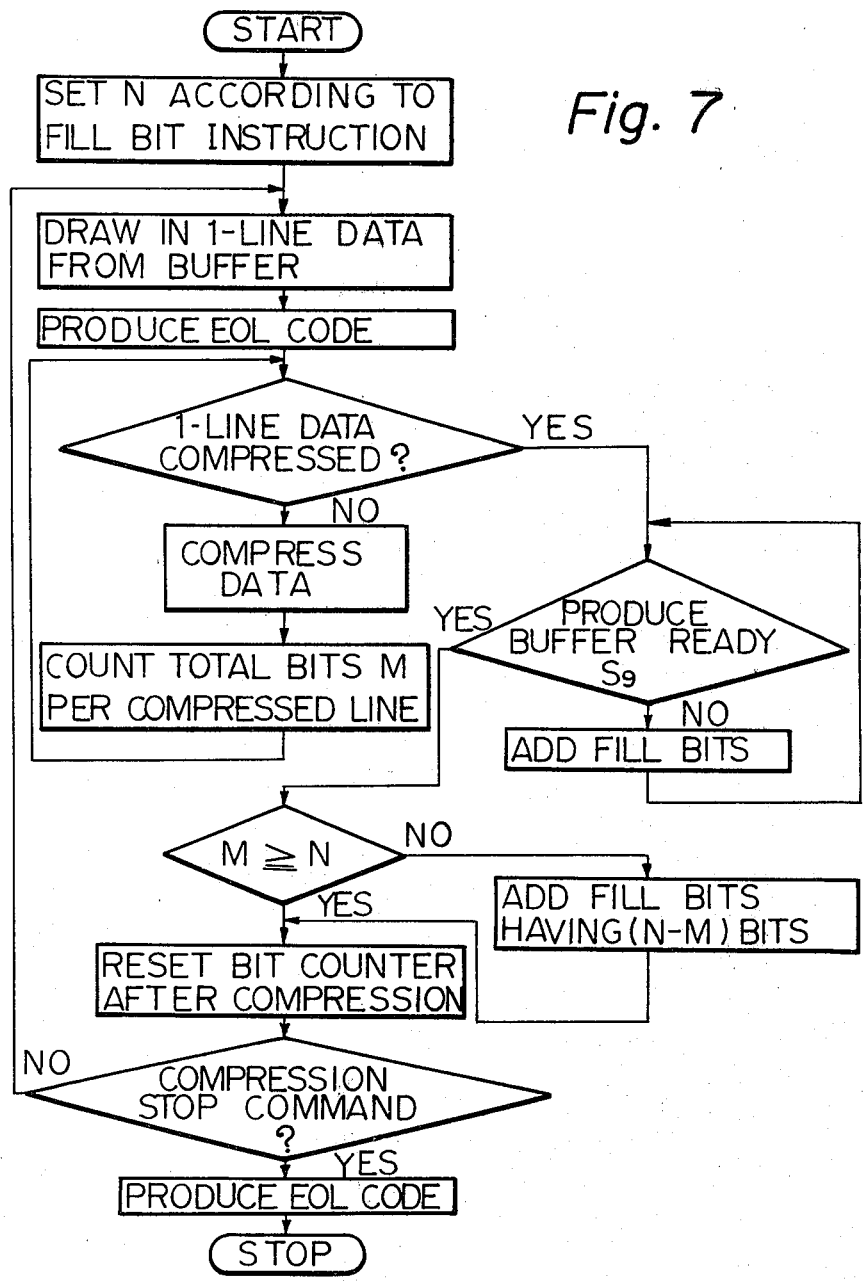
FIG. 7 is a flowchart demonstrating an operation of the compressing/decoding unit.
Figure 8:
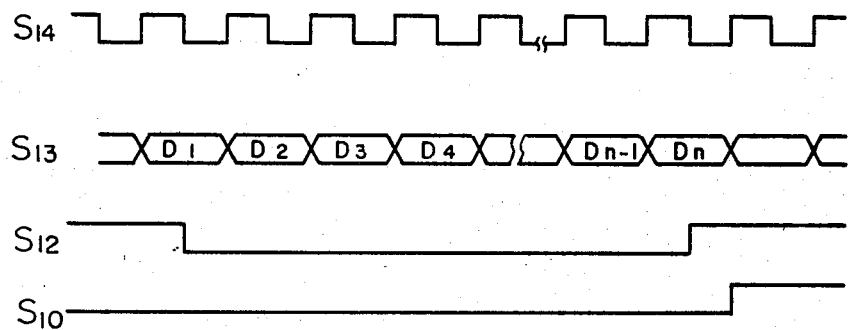
FIG. 8 is a timing chart explanatory of operation of the compressing/decoding unit during data transmission.

Meanwhile, the compressor 6 responds to the fill bit control signal S5 from the system control 10 to set the number N of compressed data bits which corresponds to the minimum 1-line transmission time, 5 ms, as indicated in the flowchart of FIG. 7. Thereupon, the compressor 6 supplies the buffer memory 5 with a binary strobe signal S12 as shown in the timing chart of FIG. 8 (negative logic) and draws one line of video data S13 thereinto from the buffer memory 5 in synchronism with clock pulses S14. At the same time, an end of line or EOL code indicating an interval between first and second lines is produced from the compressor 6. The compressor 6 then encodes the one line of data drawn thereinto by the modified Hofmann system and compresses the encoded data. The number M of bits of the compressed data is compared by the compressor 6 with the present value N and, if the actual bit number M is short of the reference bit number N which corresponds to the minimum 1-line transmission time, the compressor 6 adds fill bits just enough to make up for the shortage of data bits M. The compressor 6 in this way successively compresses data line by line with or without addition of fill bits to data bits on each line. When all of the 32 lines of video data are transferred to and compressed by the compressor 6, if the time consumed by the processing is short of the reference time 640 ms, the buffer ready signal S10 goes low since no data to be loaded in the buffer memory 5 will then be available. This starts addition of fill bits. Fill bits in this case are added to the compressed data bits till 640 ms expires. Upon the lapse of 640 ms, data which can be drawn out line by line is stored again in the buffer memory 5 whereby the buffer ready signal S10 goes high again. The procedure described hereinabove will be repeated thereafter.

As all the data on the whole document are read out and compressed, the compressor 6 is supplied with a compression stop command from the system control 10 to terminate a series of operations discussed while producing an EOL code.

Figure 9:
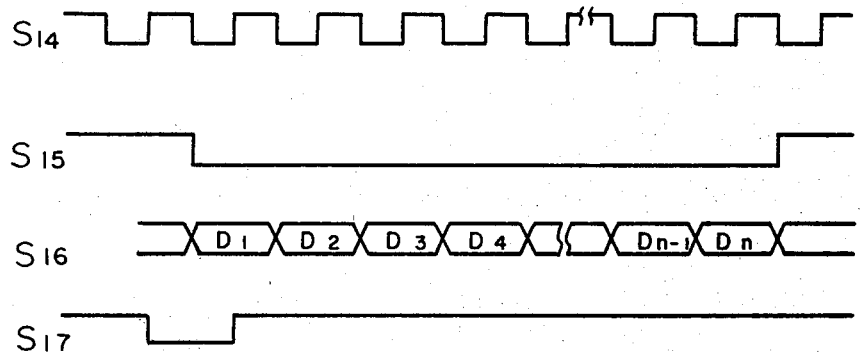
FIG. 9 is a timing chart also indicating an operation of the compressing/decoding unit but during data reception.

During data reception, the decoder 6 removes fill bits which were added to each line of data and each 32 lines of data at a remote transmitter. Every time the decoder 6 decodes one line of input data, it supplies the buffer memory 6 with a record data go signal S15 indicative of an effective data range of one line, decoded data S16 and an end of line sync signal S17 indicative of an interval between lines as shown in the timing chart of FIG. 9. The buffer memory 5 successively stores each line of decoded data S16 in an empty memory block thereof and, at the end of storing 32 lines of data, supplies the system control 10 with a stored data ready signal S18. In response to this signal S18, the system control 10 delivers a command to the mechanism control unit 4 so that each 32 bits of video data produced from the buffer memory 5 in the manner described are printed on the paper sheet in succession.

As will now be seen, the apparatus described hereinabove reduces the number of necessary fill bits and thereby attains a noticeable increase in the transmission efficiency because it determines a minimum transmission time for each 32 lines of data and adds fill bits at the end of each 32 lines of data based on the minimum transmission time. Suppose that a modem having a transmission rate of 9600 bps is used and that a minimum transmission time for each 32 lines of data is 640 ms. Conventionally, a minimum transmission time for one line is determined as 20 ms by simply dividing 640 by 32 and then fill bits are added on a line by line basis, which results in addition of a very large number of fill bits in total. In contrast, the system of the invention determines the number of fill bits to be added on a 32-line basis and, in view of the fact that compressed data longer than 20 ms naturally occupy a substantial part of the 32-line compressed data, the time period for compressing 32 lines of data becomes approximate to 640 ms thereby insertion of fill bits almost needless.

Additionally, the illustrated apparatus can communicate even with a remote receiver which entirely lacks memory blocks since it ensures a minimum transmission time for one line, too.

Reference will be made again to FIGS. 1–5 to describe a more practical form of the first-mentioned apparatus and which constitutes a second embodiment of the present invention.

Naturally, a facsimile transceiver can transmit video data to another remote facsimile transceiver without any trouble as long as the latter is equipped with a buffer memory whose capacity is the same as the former, e.g. 32 lines×2, and common to the former in the construction and functions for reading and recording data. However, the addressed transceiver or receiver may have a smaller capacity buffer memory and/or a slower recording speed than that of the addressing transceiver or transmitter. The system according to the second embodiment is designed to operate in four different modes concerning addition of fill bits to compressed data to be capable of communicating even with a receiver which is different in construction and function, carrying out transmission of video data with efficiency.

Suppose that a receiver to be addressed by the apparatus of the invention has a recording speed of 1 line/S ms.

In a first mode or mode 1, fill bits are added to each line of data such that the transmission time of one line equals to S ms. Fill bits are also added to each N lines by the number which corresponds to [N×S−(transmission time of N lines of compressed data)] ms.

In a second mode or mode 2, fill bits are added to each line of data such that the transmission time of one line equals to S ms. Fill bits are also added to each M lines by the number which corresponds to

[M×S−(transmission time of M lines of compressed data)] ms.

In a third mode or mode 3, compressed data is transmitted without accompanying any fill bit.

In a fourth mode or mode 4, fill bits are added on a line by line basis so that the one line transmission time becomes S ms which matches the recording speed S ms of the receiver.

The apparatus according to this second embodiment will be operated as follows.

Figure 10:
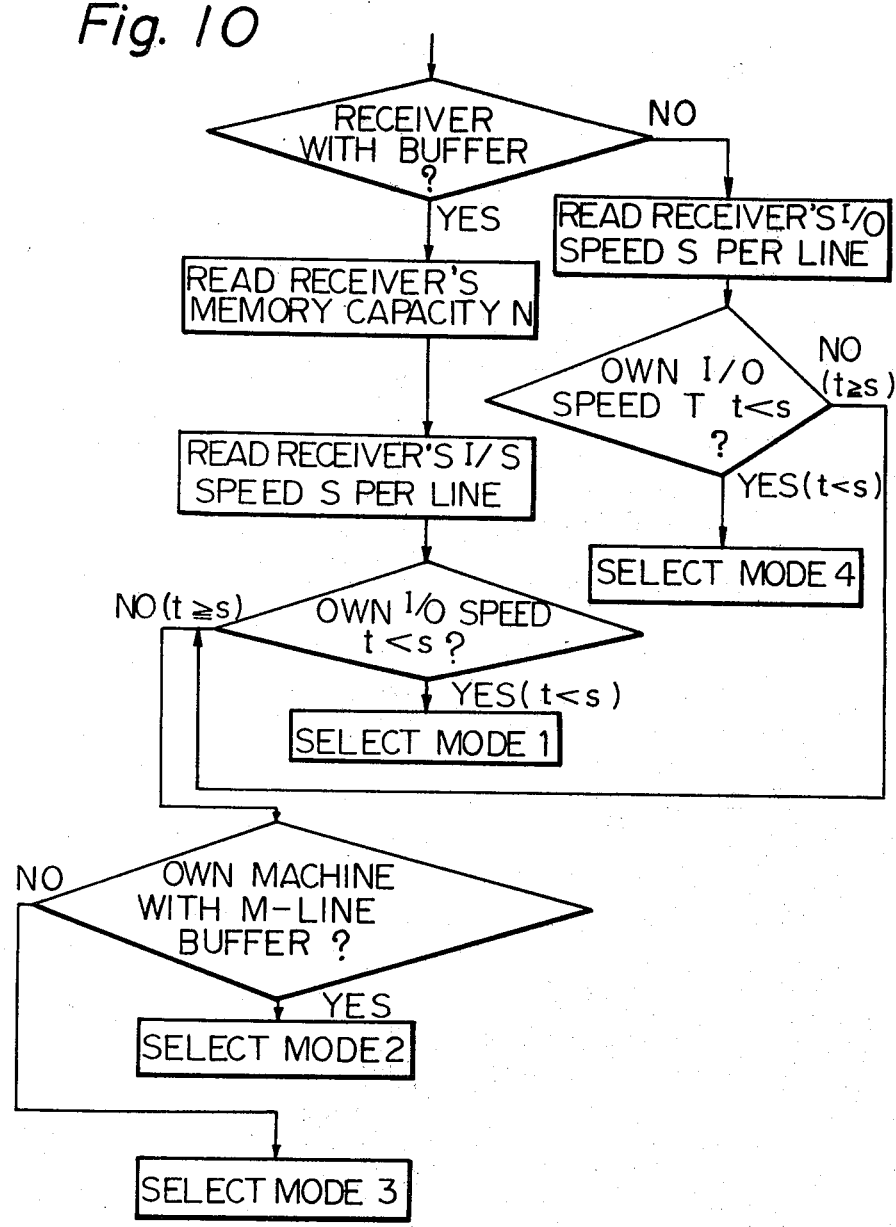
FIG. 10 is a flowchart showing a mode setting operation according to another embodiment of the present invention.

When the telephone or the like between the apparatus and a remote receiver is established, a protocol is made according to a control procedure which CCITT advised on GIII machines. For example, the transmitter calls up (CNG) the receiver and the latter replies the former producing a called station identification (CED) signal of a single tone. Then the receiver supplies the transmitter with a digital identification (NSF) signal which indicates the capacity of its buffer memory, recording speed etc. for instance. In response to the NSF signal, the transmitter as shown in the flowchart of FIG. 10 selects one of the first to fourth fill bit addition modes 1-4. The selected mode is delivered to the receiver together with other selected functions as a digital set command (NSS).

Figure 11:
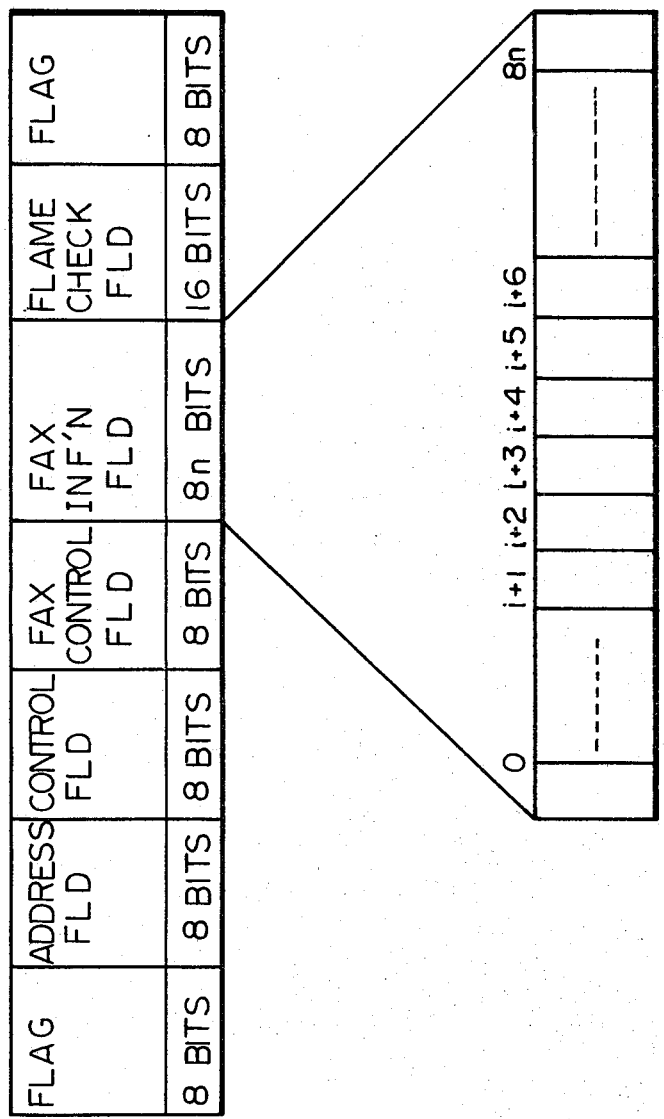
FIG. 11 is a diagram showing a frame of data which are exchanged between a transmitter and a receiver in connection with the mode setting operation.

More specifically, various information exchanged between the transmitter and receiver are contained in a frame as shown in FIG. 11. The fields in the frame include a facsimile control field which contains codes for indicating NSF, NSS and the like and a facsimile information field which contains codes for indicating different functions. In this embodiment, the facsimile information field has three bits i+1 to i+3 allotted to indicate a buffer memory capacity and other three bits i+4 to i+6 allotted to indicate a recording speed. Tables 1 and 2 shown below indicate exemplary codes for indicating different buffer memory capacities and recording speeds, respectively.

TABLE 1

| i + 1 | i + 2 | i + 3 | MEMORY CAPACITY (N) |
|---|---|---|---|
| 1 | 0 | 0 | 16 lines |
| 0 | 1 | 0 | 32 lines |
| 1 | 1 | 0 | 64 lines |
| 0 | 0 | 1 | 128 lines |
| 1 | 0 | 1 | 256 lines |
| 0 | 1 | 1 | 512 lines |
| 0 | 0 | 0 | 1 or 0 lines |

TABLE 2

| i + 4 | i + 5 | i + 6 | RECORDING SPEED (S) |
|---|---|---|---|
| 1 | 0 | 0 | 5 ms/1 |
| 0 | 1 | 0 | 10 ms/1 |
| 1 | 1 | 0 | 20 ms/1 |
| 0 | 0 | 1 | 40 ms/1 |

When the transmitter is supplied with a specific digital identification signal which represents the receiver's functions, it determines a relationship between the recording speed and buffer memory capacity of the receiver and the reading speed and buffer memory capacity of its own as indicated in the flowchart of FIG. 10. Then, if the receiver has a buffer memory of an N-line capacity and the receiver's recording speed S (ms/l) is slower than the transmitter's reading speed t (ms/l), the transmitter will select the mode 1. If the receiver's recording speed S is faster than the transmitter's reading speed t and if the transmitter has an M-line buffer memory, the transmitter will select the mode 2; if the transmitter does not have an M-line buffer memory, it will select the mode 3. If the receiver lacks a buffer memory and its recording speed S is slower than the transmitter's reading speed t, the transmitter will select the mode 4; if the receiver's recording speed S is faster than the transmitter's reading speed, the transmitter will select the mode 2 or 3 depending on whether it has an M-line buffer memory.

The selected mode is supplied as a digital set command or NSS signal to the receiver whereupon the latter sets up a corresponding function therein.

Then the transmitter supplies the receiver with reference data for modem training which includes phase matching of a high-speed modem for video data transmission. Further, a training check (TCF) signal is coupled from the transmitter to the receiver in order to inquire the result of the modem training. If the result is acceptable, the receiver delivers a confirmation signal (CFR) indicating that it is ready to receive facsimile data.

In this way, transmission of actual video data is preceded by a protocol and, if the protocol is successful, the transmitter starts delivering video data to the receiver.

The operation will be described taking for example a case wherein the transmitter has a buffer memory having a capacity of 32 lines and a 32-line reading speed of 640 ms or a 1-line reading speed of 20 ms while the receiver has a buffer memory of a 1-line capacity, a storing speed of 5 ms per line and a modem rate of 9600 bps, thus the mode 2 being selected by the transmitter.

In the event of video data transmission, as shown in FIG. 5, the system control 10 in the transmitter supplies a clear signal S1 to the buffer memory 5 so that shift registers inside the buffer memory 5 is initialized. At the same time, a transmission mode set signal S2 is coupled from the system control 10 to the buffer memory 5 conditioning the latter for data transmission. The system control 10 also supplies the compressor 6 with a clear signal S3 to initialize a status register in the compressor 6, a transmission mode set signal S4 to command a compression operation, and a fill bit control signal S5 or S6 to instruct a minimum 1-line transmission time which may be 5 ms instructed by the signal S5.

After the buffer memory 5 and compressor 6 have been fully initialized, the system control 10 delivers a command to the mechanism control unit 4 (see FIG. 1) so that the reading unit 1 is caused to start reading data by each 32 lines. Simultaneously, the system control 10 activates the buffer memory 5 by delivering a buffer start signal S7 thereto. When either one of the 32-line memory blocks in the buffer memory 5 becomes filled with video data S8 which is produced from the reading unit 1 in action, the system control 10 suppies a start signal S9 to the compressor 6.

Figure 12:
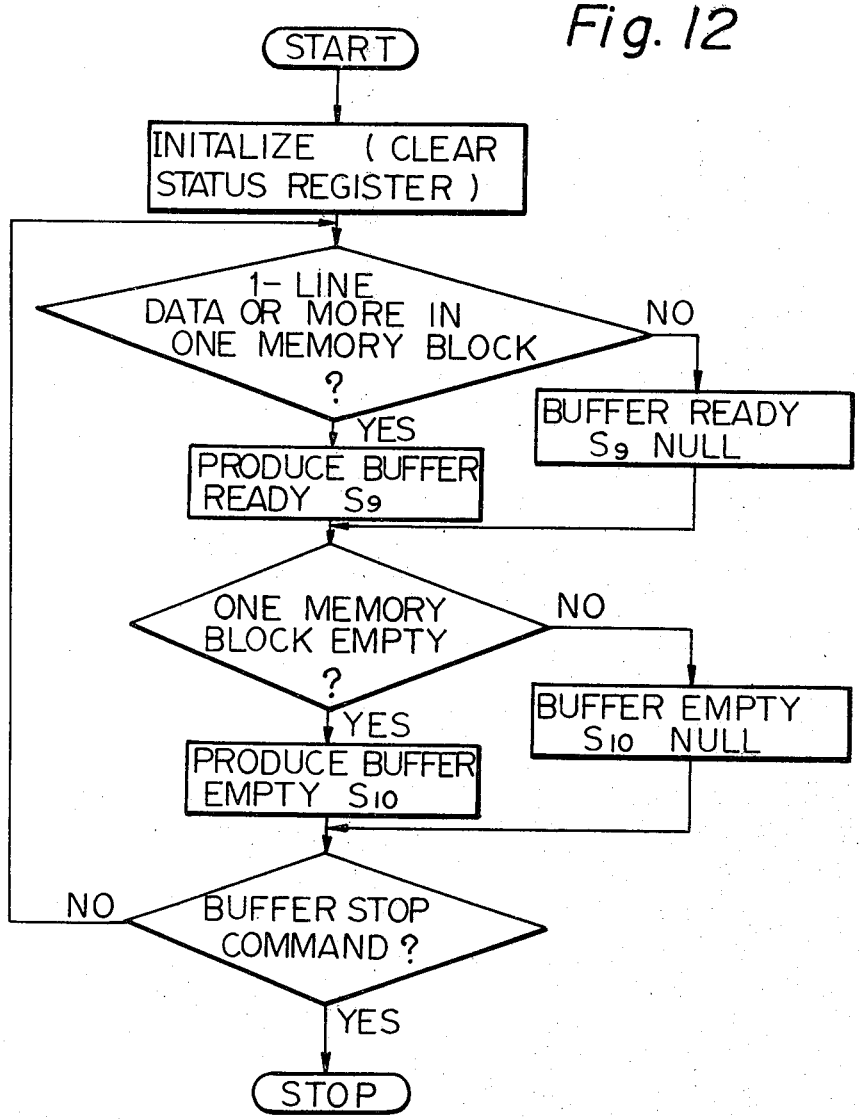
FIG. 12 is a flowchart showing an operation of the buffer memory of FIG. 5.

Upon a start of operation, the buffer memory 5 as shown in the flowchart of FIG. 12 determines whether or not either one of its memory blocks has been loaded with at least one line of video data to be coupled to the compressor 6. If one memory block has been loaded, the buffer memory 5 supplies the compressor 6 with a buffer ready signal S10. If at the same time the other memory block is empty and ready to receive another group of video data S8 from the reading unit 1, the buffer memory 5 delivers buffer empty signal S11 to the system control 10. While a buffer empty signal S11 is being produced from the buffer memory 5, the system control 10 couples a read command to the mechanism control unit 4 at an interval of 640 ms. Based on this command, 32 lines of video data S8 read out by the unit 1 is stored in a memory blocks which is empty then.

Figure 13:
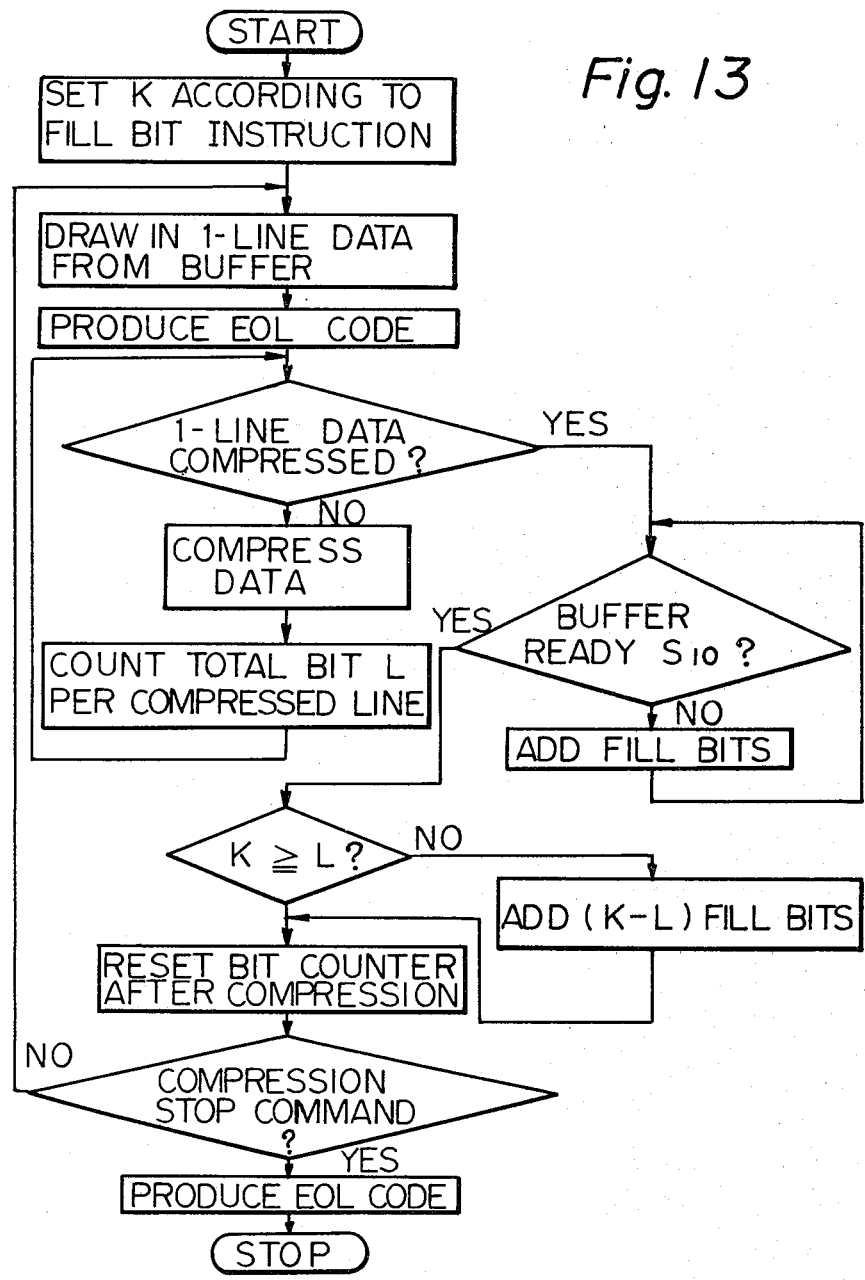
FIG. 13 is a flowchart showing an operation of the compressing/decoding unit of FIG. 5.
Figure 14:
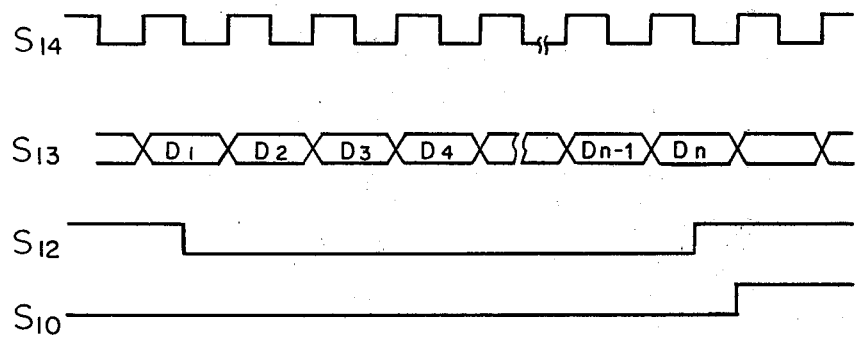
FIG. 14 is a timing chart demonstrating an operation of the compressing/decoding unit of FIG. 5 at the time of data transmission.

Meanwhile, the compressor 6 responds to the fill bit control signal S5 from the system control 10 to set the number K of compressed data bits which corresponds to the minimum 1-line transmission time, 5 ms, as indicated in the flowchart of FIG. 13. Thereupon, the compressor 6 supplies the buffer memory 5 with a binary strobe signal S12 as shown in the timing chart of FIG. 14 (negative logic) and draws one line of video data S13 thereinto from the buffer memory 5 in synchronism with clock pulses S14. At the same time, an end of line or EOL code indicating an interval between first and second lines is produced from the compressor 6. The compressor 6 then encodes the one line of data drawn thereinto by the modified Hofmann system and compresses the encoded data. The number L of bits of the compressed data is compared by the compressor 6 with the preset value K and, if the actual bit number L is short of the reference bit number K which corresponds to the minimum 1-line transmission time, the compressor 6 adds fill bits just enought to make up for the shortage of data bits K. The compressor 6 in this way successively compresses data line by line with or without insertion of fill bits to data bits on each line. When all of the 32 lines of video data are transferred to an compressed by the compressor, if the time consumed for the processing is short of the reference time 640 ms, the buffer ready signal S10 goes low since no data to be loaded in the buffer memory 5 will be available. This starts addition of fill bits. Fill bits in this case are added to the compressed data till 640 ms expires. Upon the lapse of 640 ms, data which can be drawn out line by line is stored again in the buffer memory 5 whereby the buffer ready signal S10 goes high again. The procedure described hereinabove will be repeated thereafter.

As all of the data on the whole document are read out and compressed, the compressor 6 is supplied with a compression stop command from the system control 10 to terminate a series of operations discussed while producing an EOL code.

When the transmitter selects the mode 1 on the other hand, a procedure similar to the above will occur by controlling the time period for compression for each N lines in accordance with a memory capacity at the receiver and adding fill bits accordingly. When the selected mode is either the mode 1 or the mode 2, the procedure will be the same as above except for the omission of addition of fill bits which would be performed on a plural lines basis.

Having the construction described above, the apparatus will decode input data in the following manner.

Figure 15:
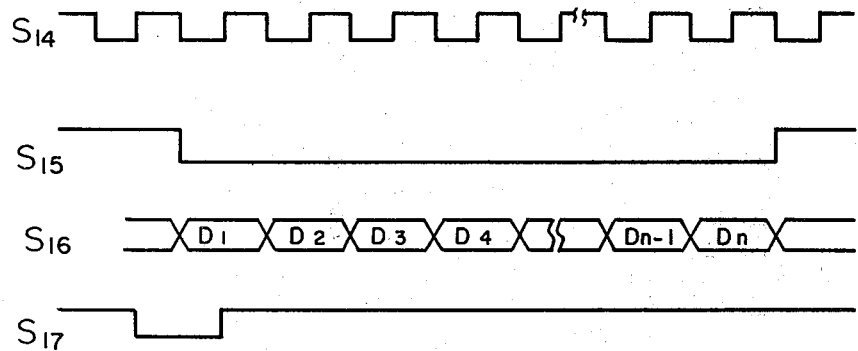
FIG. 15 is a timing chart showing an operation of the compressing/decoding unit of FIG. 5 at the time of data reception.

The decoder 6 removes fill bits added to each line of data added to each line of data and each 32 lines of data at the transmitter. Every time the decoder 6 decodes one line of input data, it supplies the buffer memory 5 with a record data go signal S15 indicative of an effective data range of one line, decoded data S16 and an end of line sync signal S17 indicative of an interval between lines as shown in the timing chart of FIG. 15. The buffer memory 5 successively stores each line of decoded data S16 in an empty memory block thereof and, at the end of storing 32 lines of data, supplied the system control 10 with a stored data ready signal S18. In response to this signal S18, the system control 10 delivers a command to the mechanism control unit 4 so that each vertical 32 bits of video data produced from the buffer memory 5 in the manner described are printed on the paper sheet in succession.

Thus, the apparatus can get into communication with another apparatus even though the latter may differ from the former in construction and function. Furthermore, in case where the transceiver selects the mode 1 or 2 and transmits data processed accordingly, not only the efficiency in the use of the compressor 6 but the data transmission efficiency are markedly improved.

More specifically, supposing that the mode 2 has been selected (modem rate of 9600 bps, minimum 32-line transmission time of 640 ms), it has been customary to determine a minimum transmission time for one line as 20 ms simply by dividing 640 by 32 and then add fill bits on a line by line basis, which has resulted in addition of a very large number of fill bits in total. This is contrastive to the system of the invention which adds fill bits for each line to ensure 5 ms while adding fill bits at the end of each 32 lines to ensure 640 ms. Since a substantial part of 32-lines of compressed data is naturally occupied by compressed data which last longer than 20 ms, the time period taken to process 32 lines of data is approximate to 640 ms. Consequently, hardly any fill bits are required at the end of each 32 lines of data and this offers a far higher efficiency in the use of the compressor/decoder 6 and a far higher efficiency of video data transmission compared with the conventional practice.

Using CCITT standard documents DOC#1, DOC#4 and DOC#7 and by computer simulation, we determined transmission times each per document page which are achievable with a prior art system in which the minimum transmission time per line is 20 ms, and with the embodiment described which is operated in the mode 1 or 2 with 640 ms for 32 lines and 32-line buffer memory.

TABLE 3

|  | MODEM RATE | | (20 ms/line) |
| --- | --- | --- | --- |
| DOCUMENT | 2400 bps | 4800 bps | 9600 bps |
| DOC#1 | 61.021 | 38.771 | 28.891 |
| DOC#4 | 160.586 | 84.869 | 48.167 |
| DOC#7 | 171.831 | 88.702 | 47.566 |

TABLE 4

|  | MODEM RATE | | (640 ms/32 lines) |
| --- | --- | --- | --- |
| DOCUMENT | 2400 bps | 4800 bps | 9600 bps |
| DOC#1 | 57.606 | 34.708 | 25.730 |
| DOC#4 | 158.039 | 80.836 | 43.013 |
| DOC#7 | 171.213 | 87.527 | 46.011 |

It will be seen from Tables 3 and 4 that this embodiment succeeds in shortening the time period necessary for data transmission and improves the transmission efficiency to a significant extent compared with the prior art system.

While the present invention has been shown and described as transmitting video data by ensuring a minimum transmission time for each line and, at the same time, a minimum transmission time for each plural lines, it is possible, depending on the functions of a remote receiver, to ensure a minimum transmission time for each plural lines but not that for each line.

In summary, it will be seen that the present invention provides a facsimile apparatus which, regardless of the functions of another facsimile apparatus which it addresses, cuts down the total number of necessary fill bits without resort to an increase in the reading speed or the recording speed and thereby achieves a high efficiency in the use of its decoding device and a high data transmission efficiency.

Various modifications will become possible for those skilled in the art after receiving the teachings of the present disclosure without departing from the scope thereof.

What is claimed is:

1. A facsimile apparatus including scanning means, buffer memory means having a predetermined capacity for storing data from the scanning when the apparatus operates in a transmission mode, compression means for encoding and compressing data from the buffer memory means and producing coded or compressed data in lines when the apparatus operates in a transmission mode, characterized by comprising:

first fill bit generator means for producing fill bits which are added to each line of compressed data when an actual duration of compressed data on a line is shorter than a predetermined reference duration;

second fill bit generator means for producing fill bits which are added to each predetermined number of plural lines of compressed data when an actual duration of compressed data on plural lines is shorter than a predetermined reference duration; and control means for controlling the first and second fill bit generator means to actuate at least one of the first and second fill bit generator means depending at least upon the capacity of a buffer memory means and the speed of a recording unit at a remote receiver which said apparatus is call up for communication.

2. An apparatus as claimed in claim 1, wherein the reference duration for a line of compressed data is 20 ms.

3. An apparatus as claimed in claim 1, wherein the reference duration for plural lines of compressed data is 640 ms.

4. A facsimile transmission process comprising the steps of:

providing first fill bit generator means for producing fill bits which are added to each line of compressed data when an actual duration of compressed data on a line is shorter than a predetermined reference duration;

providing second fill bit generator means for producing fill bits which are added to each predetermined number of plural lines of compressed data when an actual duration of compressed data on plural lines is shorter than a predetermined reference duration;

sensing a capacity of a buffer memory means and a speed of a recording unit at a remote receiver which is being called up for communication; and actuating at least one of the first and second fill bit generator means depending at least upon said sensed capacity and speed.

5. An apparatus as claimed in claim 4, wherein the reference duration for a line of compressed data is 20 ms.

6. An apparatus as claimed in claim 4, wherein the reference duration for plural lines of compressed data is 640 ms.

* * * * *